Figure 1:
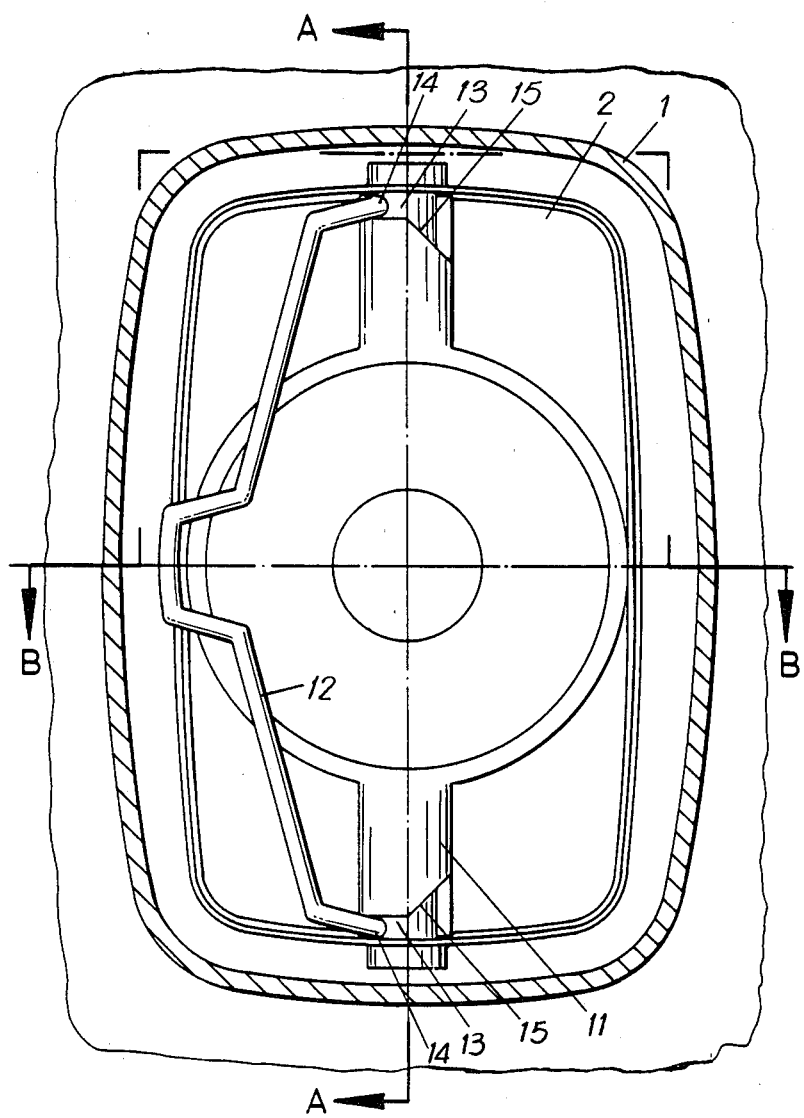

United States Patent [19]

Freudenreich et al.

[11] 4,385,345
[45] May 24, 1983

[54] VEHICLE HEADLAMPS

[75] Inventors: Erwin Freudenreich; Hans-Georg Stens, both of Lippstadt, Fed. Rep. of Germany

[73] Assignee: Westfälische Metall Industrie KG Hueck & Co., Lippstadt, Fed. Rep. of Germany

[21] Appl. No.: 222,336

[22] Filed: Jan. 5, 1981

[30] Foreign Application Priority Data

Feb. 7, 1980 [DE] Fed. Rep. of Germany ....... 3004446

[51] Int. Cl.³ .......................... B60Q 1/06; F21V 21/00
[52] U.S. Cl. .......................................... 362/80; 362/83; 362/226; 362/306
[58] Field of Search ...................... 362/83, 80, 66, 226, 362/306, 288

[56] References Cited

U.S. PATENT DOCUMENTS

| | | | |
|---|---|---|---|
| 2,431,641 | 11/1947 | Gregorie et al. | 362/83 |
| 2,733,336 | 1/1956 | Clayton | 362/306 |
| 3,086,104 | 4/1963 | Atkin | 362/306 |
| 3,502,864 | 3/1970 | Wagner | 362/306 |
| 3,710,097 | 1/1973 | Bright et al. | 362/80 X |
| 3,789,212 | 1/1974 | Wagner | 362/306 |
| 4,196,459 | 4/1980 | Dick | 362/80 X |
| 4,318,161 | 3/1982 | Shanks | 362/226 |
| 4,318,162 | 3/1982 | Sip | 362/226 |

FOREIGN PATENT DOCUMENTS 1203574  8/1959  France ............................. 362/226

Primary Examiner—David H. Brown
Attorney, Agent, or Firm—Max Fogiel

[57] ABSTRACT

A vehicle headlamp in which an optical unit for a sealed beam is mounted between a carrier ring fixed to the vehicle and a removable cap ring. On the carrier ring two diametrically opposed pins are supported in bearing bushes to be coaxially rotatable and axially displaceable. Both pins are fixed to a resilient clip that bears on cam faces on the outer ends of the bushes. Upon pivoting the clip, the pins are jointly rotated and, by the action of the cam faces are axially oppositely displaced. As they are extended outwards they engage recesses in the cap ring to secure it to the carrier ring. Eccentric portions on the outer ends of the pins thereupon bear on the recesses with further rotation of the pins to draw the cap ring and carrier ring together to grip firmly an interposed rim of the optical unit.

9 Claims, 6 Drawing Figures

VEHICLE HEADLAMPS

The invention relates to vehicle headlamps in which a reflector and a diffusing lens are combined to form an optical unit to be held between a carrier and by a cap.

This type of headlamp construction is usually necessary when both the diffusing lens and the reflector are made of glass, as is customary in sealed beam headlamps, since in such cases it is not possible for a fastening member to be attached either to the reflector or to the diffusing lens at a cost acceptable for mass production. The carrier and cap are both in the form of rings, and they are urged together axially to grip an outer rim of the optical unit firmly between them. In order to enable the headlamp units to be replaced from the front of the vehicle in the event of a defect, the cap ring is fastened by means of screws which can be screwed in and out from the front of the headlamp. In order to make this possible, the cap ring is provided on its outer periphery with radially projecting lugs screwed to the carrier ring. In order to leave access to these screws a wide gap extending around the unit must be left between the cap ring and the opening in the vehicle body accommodating the headlamp. This has the disadvantage that another component, namely a mask ring, must be used to cover this gap, while in addition a very large opening is required in the vehicle body for the insertion of the headlamp. Such a large amount of space is however not always available for the accommodation of headlamps. Another disadvantage of this type of fastening for the cap ring is that its screw connections lie deep in the headlamp housing. This leads to difficulties in the insertion and removal of the optical unit, particularly as the screw connections are blocked from view.

According to the present invention, there is provided a vehicle headlamp in which a reflector and a diffusing lens are combined to form an optical unit that is secured between a carrier and a capping member (a) said carrier and capping member being interengageable by a pair of diametrically opposed elements that are relatively displaceable radially with respect to respective receiving elements to form pin and socket connections therewith, (b) the displaceable elements being mounted in guide means to be displaceable towards and away from each other and rotatable about a common axis extending in the direction of said displacement, (c) means interconnecting the displaceable elements for their joint rotation axially with resilient deformation of said means, (d) cam means operating on said displaceable elements in their rotation to displace them axially oppositely to and from extended positions in which they engage their receiving elements so as to hold the capping member against the carrier with an interposed portion of the optical unit retained therebetween.

In a preferred form of the invention, said displaceable elements comprise portions engaging their receiving elements that are eccentrically disposed with respect to their axis of rotation. This can ensure that the carrier and the capping member will be drawn together to grip firmly the interposed outer edge of the optical unit. In order to ensure that the displaceable elements will engage in their receiving elements before said eccentric portions come into action, the cam means can be so constructed that the displaceable elements are axially displaced in a first stage of their rotation and that said eccentric portions will act on the receiving recesses only after further rotation of the elements.

In a preferred form of the cam means, each displaceable element has a radial projection engaging a fixed track at least a part of which extends circumferentially obliquely to the axis of the element. These radial projections may be formed by the ends of a resilient member connecting the two displaceable elements.

Figure 2:
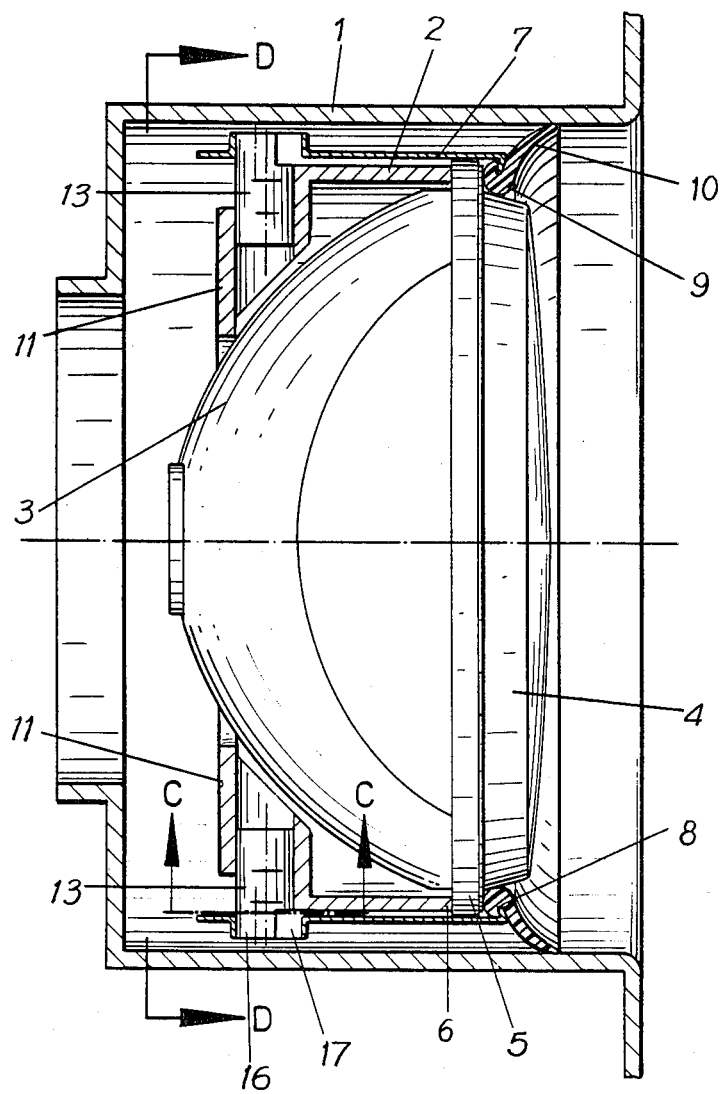
Figure 3:
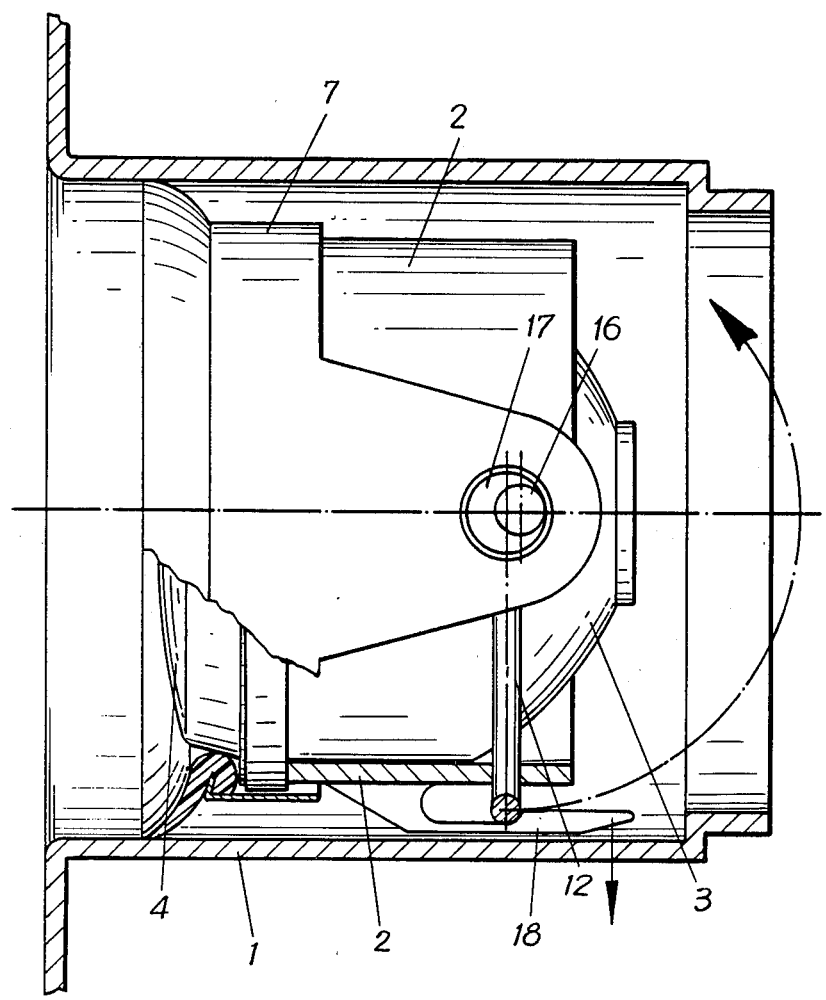
Figure 4:
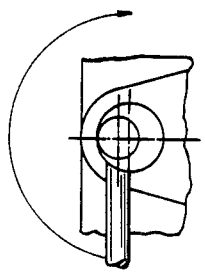
Figure 5:
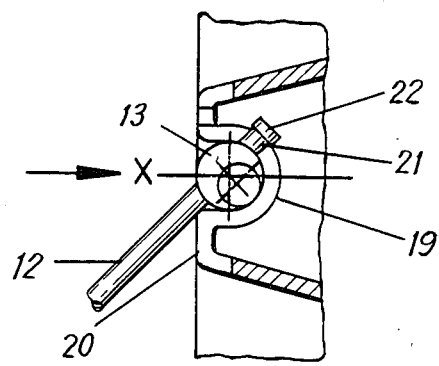
Figure 6:
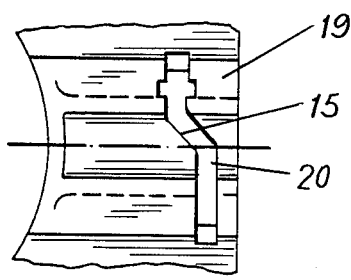

The invention is illustrated by way of example in the accompanying drawings, in which:

FIG. 1 is a rear view of a headlamp according to the invention in a section on the line D—D of FIG. 2, FIG. 2 is a section on the line A—A of FIG. 1, FIG. 3 is a section on the line B—B of FIG. 1, FIG. 4 is a partial section on the line C—C of FIG. 2, FIG. 5 shows a detail of a modified construction according to the invention in a view corresponding to the section C—C, and FIG. 6 is a view from the direction X of FIG. 5.

The casing 1 is either a part of the vehicle body or is fastened, for example by welding, as a separate part to the vehicle body. A carrier frame or carrier ring 2 is inserted into this casing 1 in such a manner as to be fixed but adjustable about horizontal and vertical axes. This adjustability is necessary in order to enable the headlamp beam to be correctly directed. The optical unit comprising a reflector 3 and a diffusing lens 4 is inserted into the adjustable carrier ring 2 in such a manner that it lies with its outer peripheral flange 5 on the outer or forward edge 6 of the carrier ring. Over the optical unit is placed a cap ring 7, whose radially inwardly directed flange 8 lies, with the interposition of a seal 9, on the outwardly directed flange 5 of the optical unit and presses the flange 5 against the outer or forward edge 6 of the carrier ring 2. The seal 9 gripped between the cap ring 7 and the flange 5 of the optical unit has, extending around it, a lip 10 which projects radially outwards and bears against the inner wall of the casing 1 for the purpose of sealing the interior of the headlamp casing.

The cap ring 7 must be fastened to the carrier ring 2 in such a manner that the cap ring is urged towards the outer edge 6 of the carrier ring. This fastening is effected with the aid of two coaxial pins 13, which, mounted diametrically opposite each other, are each inserted into sleeve-shaped bearing bushes 11 on the carrier ring 2 in such a manner as to be axially displaceable. The two pins 13 are joined together by means of a resilient clip 12 that serves for rotating the pins 13 about their central axis. Because of the resilience of the clip 12 its ends 14 are held against inclined end faces 15 at the outer ends of the bushes 11; these act in the manner of cams, in that with the swivelling of the clip 12 they displace the two pins 13 axially. The overall length of the clip 12 is thereby varied, that is to say when the pins 13 are moved radially away from one another the clip 12 is elastically extended in length, while when the pins are moved towards one another the clip contracts because of its resilience. In FIG. 1 the clip is shown swivelled down to a position in which the pins 13 are in their extended positions and engage in the cap ring 7. When the clip is swung over through 180°, the contraction of the clip moves the pins 13 towards one another to such an extent that the cap ring 7 is freed and can be pulled off in the forward direction.

The end faces 15, acting in the manner of cams, are so formed that on the swivelling of the clip for fastening purposes the two pins 13 are moved apart in the first half of the swivelling movement to bring eccentric projections 16 forming the outer ends of the pins into receiving recesses 17 in the cap ring 7. In the second half of the swivelling movement the pins 13 do not further change their positions in the axial direction, but during this stage of the movement the eccentric projections 16 move rearwards to bear on the walls of the receiving recesses 17 in the cap ring, drawing the cap ring rearwards and clamping together the carrier ring 2 and the cap ring 7. This has the advantage that the two pins 13 reliably engage in the recesses 17 in the cap ring when the clip 12 is swivelled, and that the parts which have to be clamped together are so clamped by a relative movement of these two parts only on the further swivelling of the clip. In the position of the clip 12 in which the carrier ring 2 and the cap ring 7 are clamped together, the clip 12 engages in a snap catch 18 (FIG. 3).

In use, the optical unit, together with the cap ring engaging over its outer edge, is inserted with one hand from the front into the opening in the vehicle body or into its casing, and with the other hand the clip is swivelled over in one movement from the rear of the headlamp. Fastening is thus effected simply, rapidly and reliably, without any special skill being required. In addition the advantage is obtained that the components serving for the fastening of the optical unit project only slightly beyond the outer edge of the optical unit, so that the opening in the vehicle body may practically correspond to the frontal dimensions to the optical unit.

The advantages of the above-described construction can also be obtained from the modified form of construction shown in FIGS. 5 and 6. In this the bearings for the pins 13 are simply in the form of bearing half-bushes 19 each provided with a slot 20 in which engages a stud 21 fastened to the associated pin 13. One region of the slot has a face 15 obliquely inclined to the axis of rotation defined by the half-bushes. On rotating the pins 13 the studs 21 slide along the inclined faces 15 and the pins 13 are displaced radially and oppositely in the manner already described. In order to ensure that the pins cannot lift out of the bearing half-bushes 19, the studs 21 are each provided with a head 22 which has a diameter larger than the width of the slot 20 and which engages behind the bearing bush 19.

It will be seen that in the constructions described above there is provided a headlamp mounting connection which is easy to manipulate both for fastening and for unfastening, and which can be operated easily and rapidly, even by the unskilled, to hold a headlamp securely. The fastening and unfastening of the connection is effected from the rear of the headlamp while the optical unit together with the cap ring can nevertheless be taken out from the front.

We claim:

1. A vehicle headlamp comprising a reflector and a diffusing lens combined to form an optical unit secured between a carrier and a capping member,
   (a) said carrier and capping member being interengageable by a pair of diametrically opposed pins on the carrier that are relatively displaceable with respect to receiving recesses in the capping member to form pin and socket connections therewith,
   (b) said pins being mounted in bearing bushes on the carrier to be rotatable in said bushes and displaceable towards and away from each other axially of said bushes,
   (c) said two pins being interconnected by resilient means rotatable with the pins, and acting on the pins to urge them to end axial positions from which they are displaceable with resilient deformation of said means,
   (d) cam means acting on said pins whereby joint rotation of the pins also displaces them axially oppositely to and from extended positions in which they engage respective recesses so as to hold the capping member against the carrier with an interposed peripheral portion of the optical unit retained therebetween.

2. A vehicle headlamp comprising: a reflector and a diffusing lens combined to form an optical unit mounted between a carrier and a capping member; said carrier and capping member being interengageable by a pair of diametrically opposed elements that are relatively displaceable radially with respect to respective receiving elements to form pin and socket connections therewith; guide means for mounting said displaceable elements and having means for displacement of said displaceable elements towards and away from each other and for rotation of said displaceable elements about a common axis extending in the direction of displacement; means interconnecting the displaceable elements for their joint rotation axially; cam means operating on said displaceable elements in their rotation to displace them axially oppositely to and from extended positions in which they engage their receiving elements so as to hold the capping member against the carrier with an interposed portion of the optical unit retained therebetween.

3. A headlamp according to claim 2, wherein said displaceable elements are coaxial pins displaceable in bearing bushes on the carrier to engage respective receiving recesses in the capping member, said bearing bushes being part of said guide means.

4. Vehicle headlamp according to claim 2, including mounting means surrounding said optical unit.

5. A headlamp according to claim 2, wherein said displaceable elements comprise portions engaging their receiving elements formed eccentrically with respect to the axis of rotation of said elements such that the rotation of said elements is arranged to draw the carrier and the capping member together.

6. A headlamp according to claim 5, including means on said cam means for bringing said displaceable elements into engagement positions with respect to their respective receiving elements in a first stage of rotation, and means for drawing the carrier and capping member together by said eccentric portions in a second stage of rotation.

7. A vehicle headlamp according to claim 2, wherein said interconnecting means includes a radial projection on each displaceable element, and fixed track means along which said projection travels during rotation of the element for displacing the element axially.

8. A headlamp according to claim 7, wherein said means interconnecting the two displaceable elements comprises an elongate resilient member.

9. A headlamp according to claim 8, wherein said projections are formed by ends of said resilient member.

* * * * *